United States Patent
Filippov et al.

(10) Patent No.: US 10,887,587 B2
(45) Date of Patent: Jan. 5, 2021

(54) DISTANCE WEIGHTED BI-DIRECTIONAL INTRA PREDICTION

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: Huawei Technologies Co., Ltd., Shenzhen (CN)

(*) Notice: Subject to any disclaimer, the term of this patent is extended or adjusted under 35 U.S.C. 154(b) by 20 days.

(21) Appl. No.: 16/383,205

(22) Filed: Apr. 12, 2019

(65) Prior Publication Data

US 2019/0238837 A1 Aug. 1, 2019

Related U.S. Application Data

(63) Continuation of application No. PCT/RU2016/000703, filed on Oct. 14, 2016.

(51) Int. Cl.
*H04N 19/105* (2014.01)
*H04N 19/577* (2014.01)
(Continued)

(52) U.S. Cl.
CPC ......... *H04N 19/105* (2014.11); *H04N 19/159* (2014.11); *H04N 19/176* (2014.11);
(Continued)

(58) Field of Classification Search
CPC .. H04N 19/105; H04N 19/159; H04N 19/176; H04N 19/577; H04N 19/593; H04N 19/80
(Continued)

(56) References Cited

U.S. PATENT DOCUMENTS

2006/0222066 A1 10/2006 Yoo et al.
2011/0293001 A1 12/2011 Lim et al.
(Continued)

FOREIGN PATENT DOCUMENTS

CN 102972028 A 3/2013
CN 103283237 A 9/2013
(Continued)

OTHER PUBLICATIONS

"Series H: Audiovisual and Multimedia Systems, Infrastructure of audiovisual services—Coding of moving video, Advanced video coding for generic audiovisual services," ITU-T H.264, pp. 1-807, Institute of Electrical and Electronics Engineers—New York, New York (Feb. 2016).
(Continued)

*Primary Examiner* — Nguyen T Truong
(74) *Attorney, Agent, or Firm* — Leydig, Voit & Mayer, Ltd.

(57) ABSTRACT

A current video coding block of a frame of a video signal is intra predicted. The current video coding block comprises a plurality of pixels and each pixel is associated with a pixel value. On the basis of a plurality of primary reference pixel values a plurality of secondary reference pixel values are generated. The plurality of primary reference pixel values are associated with a plurality of primary reference pixels located in neighboring video coding blocks of the current video coding block. Each of the secondary reference pixel values is generated on the basis of two or more of the primary reference pixel values. The pixel values of the pixels of the current video coding block are intra predicted on the basis of the plurality of primary reference pixel values and the plurality of secondary reference pixel values.

18 Claims, 12 Drawing Sheets

(51) Int. Cl.
H04N 19/80 (2014.01)
H04N 19/593 (2014.01)
H04N 19/159 (2014.01)
H04N 19/176 (2014.01)

(52) U.S. Cl.
CPC ......... *H04N 19/577* (2014.11); *H04N 19/593* (2014.11); *H04N 19/80* (2014.11)

(58) Field of Classification Search
USPC .................................................. 375/240.13
See application file for complete search history.

(56) References Cited

U.S. PATENT DOCUMENTS

| | | |
|---|---|---|
| 2013/0251036 A1 | 9/2013 | Lee et al. |
| 2013/0272405 A1 | 10/2013 | Jeon et al. |
| 2013/0301709 A1 | 11/2013 | Lim et al. |
| 2014/0092980 A1 | 4/2014 | Guo et al. |
| 2017/0251213 A1 | 8/2017 | Ye et al. |
| 2018/0124426 A1 | 5/2018 | Jeon et al. |
| 2018/0288425 A1 | 10/2018 | Panusopone et al. |
| 2019/0373281 A1 | 12/2019 | Wang et al. |

FOREIGN PATENT DOCUMENTS

| | | |
|---|---|---|
| CN | 103329538 A | 9/2013 |
| CN | 103765901 A | 4/2014 |
| EP | 2658263 A2 | 10/2013 |
| JP | 2013524670 A | 6/2013 |
| KR | 20150140848 A | 12/2015 |
| WO | 2012175017 A1 | 12/2012 |
| WO | 2016066093 A1 | 5/2016 |

OTHER PUBLICATIONS

"Series H: Audiovisual and Multimedia Systems,Infrastructure of audiovisual services—Coding of moving video High efficiency video coding," ITU-T H.265, pp. 1-634, Institute of Electrical and Electronics Engineers—New York, New York (Apr. 2015).
"Information technology-High efficiency coding and media delivery in heterogeneous environments—Part 2: High efficiency video coding", ISO/IEC 23008-2:2013, pp. 1-13, International Standard (Dec. 1, 2013).
Sullivan et al., "Overview of the High Efficiency Video Coding (HEVC) Standard," in IEEE Transactions on Circuits and Systems for Video Technology, vol. 22, No. 12, pp. 1649-1668, Institute of Electrical and Electronics Engineers—New York, New York (Dec. 2012).
Alshina et al.,"Performance of JEM1.0 tools analysis by Samsung," Joint Video Exploration Team (JVET) of ITU-T SG 16 WP 3 and ISO/IEC JTC 1/SC 29/WG 11, 2nd Meeting: San Diego, USA, pp. 1-28, JVET-B0022_r1, International Union of Telecommunication—Geneva, Switzerland (Feb. 20-26, 2016).
"Position dependent intra prediction combination," International Telecommunication Union, Com 16—C 1046—E, pp. 1-5, International Union of Telecommunication—Geneva, Switzerland (Oct. 2015).
Lainema et al., "Intra Coding of the HEVC Standard," IEEE Transactions on Circuits and Systems for Video Technology, vol. 22, No. 12, pp. 1792-1801, Institute of Electrical and Electronics Engineers—New York, New York (Dec. 2012).
Sze et al., "High Efficiency Video Coding (HEVC), Algorithms and Architectures," Integrated Circuits and Systems, pp. 1-384, Springer (2014).
"Future video coding: Joint Exploration Model 1 (JEM1) for future video coding investigation," International Telecommunication Union, Study Group 16, TD 213 (WP 3/16), Geneva, pp. 1-20, International Union of Telecommunication—Geneva, Switzerland (Oct. 12-23, 2015).
Doshkovet al., Towards Efficient Intra Prediction Based on Image Inpainting Methods, 28th Picture Coding Symposium, PCS2010, pp. 470-473, Institute of Electrical and Electronics Engineers—New York, New York (Dec. 8-10, 2010).
Guo et al., "Direction based Angular Intra Prediction," Joint Collaborative Team on Video Coding (JCT-VC) of ITU-T SG16 WP3 and ISO/IEC JTC1/SC29/WG11, 6th Meeting: Torino, Italy, pp. 1-7, XP030009145, JCTVC-F122, International Union of Telecommunication—Geneva, Switzerland (Jul. 14-22, 2011).
Lin et al., "CE6.a: Report of Bidirectional UDI mode for Intra prediction," JCTVC-F509, Joint Collaborative Team on Video Coding (JCT-VC) of ITU-T SG16 WP3 and ISO/IEC JTC1/SC29/WG11, 6th Meeting: Torino, IT, pp. 1-6, XP030009532, International Union of Telecommunication—Geneva, Switzerland (Jul. 14-22, 2011).
Shiodera et al., "TE6 subset a: Bidirectional intra prediction," 3rd Meeting: Guangzhou, CN, pp. 1-10. XP030007786, JCTVC-0079, Joint Collaborative Team on Video Coding (JCT-VC) of ITU-T SG16 WP3 and ISO/IEC JTC1/SC29/WG11, WG11 No. m18102., International Union of Telecommunication—Geneva, Switzerland (Oct. 7-15, 2010).
Shiodera et al., "Simplified Bidirectional intra prediction," JCTVC-F253, Joint Collaborative Team on Video Coding (JCT-VC) of ITU-T SG16 WP3 and ISO/IEC JTC1/SC29/WG11, 6th Meeting: Torino, IT, pp. 1-8, XP030009276, International Union of Telecommunication—Geneva, Switzerland (Jul. 4-22, 2011).
Shiodera et al., "Bidirectional infra prediction," VCEG-AE14, ITU—Telecommunications Standardization Sector, Study Group 16 Question 6, Video Coding Experts Group (VCEG), 31st Meeting: Marrakech, MA, pp. 1-6 XP030003517, International Union of Telecommunication—Geneva, Switzerland (Jan. 15-16, 2007).
Yu et al., "Distance-based Weighted Prediction for H.264 Intra Coding," 2008 International Conference on Audio, Language and Image Processing, ICALIP2008, pp. 1477-1480, Institute of Electrical and Electronics Engineers, New York, New York (Jul. 2008).
"Series H: Audiovisual and Multimedia Systems, Infrastructure of audiovisual services—Coding of moving video, High efficiency video coding," ITU-T H.265, pp. 1-317, International Union of Telecommunication, Geneva, Switzerland (Apr. 2013).
Indian Patent Application No. 201817047254 filed on Dec. 13, 2018 and published on Feb. 22, 2019.

DISTANCE WEIGHTED BI-DIRECTIONAL INTRA PREDICTION

CROSS-REFERENCE TO RELATED APPLICATIONS

This application is a continuation of International Application No. PCT/RU2016/000703, filed on Oct. 14, 2016, the disclosure of which is hereby incorporated by reference in its entirety.

TECHNICAL FIELD

The present disclosure relates to the field of video coding. More specifically, the disclosure relates to an apparatus and a method for intra prediction of a video coding block as well as an encoding apparatus and a decoding apparatus comprising such an intra-prediction apparatus.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

The state-of-the-art video coding standards are based on partitioning of a source picture into video coding blocks (or short blocks). Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture. After a prediction stage, transform coding is performed for a prediction error that is the difference between an original signal and its prediction. Then, the transform coefficients and side information are encoded using an entropy coder (e.g., CABAC for AVC/H.264 and HEVC/H.265). The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways. For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as DBF, SAO and ALF try to suppress. The use of sophisticated prediction coding (such as motion compensation and intra-prediction) and partitioning techniques (e.g., QT for CUs and PUs as well as RQT for TUs) allowed the standardization committee to significantly reduce the redundancy in PUs.

The prediction tools which led to the prosperous application of these video coding standards can be roughly distinguished into inter and intra prediction tools. While intra prediction solely relies on information which is contained in the current picture, inter prediction employs the redundancy between different pictures to further increase the coding efficiency. Therefore, in general intra prediction requires higher bitrates than inter prediction to achieve the same visual quality for typical video signals.

Nevertheless, intra coding is an essential part of all video coding systems, because it is required to start a video transmission, for random access into ongoing transmissions and for error concealment. In the HEVC standard, however, only one adjacent row/column of pixels is used as a prediction basis for the currently processed video coding block (which in case of HEVC is referred to as coding unit or CU). Furthermore, in case of intra prediction based on an angular prediction, only one direction can be applied per CU. Due to these limitations, high bit rates are required for the residuals of intra coded CUs.

Thus, there is a need for devices and methods for video coding, which allow increasing the coding efficiency for intra prediction.

SUMMARY

It is an object to provide devices and methods for video coding, which allow increasing the coding efficiency for intra prediction.

The foregoing and other objects are achieved by the subject matter of the independent claims. Further implementation forms are apparent from the dependent claims, the description and the figures.

The following disclosure employs a plurality of terms which, in embodiments, have the following meaning: Slice—a spatially distinct region of a picture that is independently encoded/decoded. Slice header—Data structure configured to signal information associated with a particular slice. Video coding block (or short block)—an M×N (M-column by N-row) array of pixels or samples (each pixel/sample being associated with at least one pixel/sample value), or an M×N array of transform coefficients. Coding Tree Unit (CTU) grid—a grid structure employed to partition blocks of pixels into macro-blocks for video encoding. Coding Unit (CU)—a coding block of luma samples, two corresponding coding blocks of chroma samples of an image that has three sample arrays, or a coding block of samples of a monochrome picture or a picture that is coded using three separate color planes and syntax used to code the samples. Picture Parameter Set (PPS)—a syntax structure containing syntax elements that apply to zero or more entire coded pictures as determined by a syntax element found in each slice segment header. Sequence Parameter Set (SPS)—a syntax structure containing syntax elements that apply to zero or more entire coded video sequences as determined by the content of a syntax element found in the PPS referred to by a syntax element found in each slice segment header. Video Parameter Set (VPS)—a syntax structure containing syntax elements that apply to zero or more entire coded video sequences. Prediction Unit (PU)—a prediction block of luma samples, two corresponding prediction blocks of chroma samples of a picture that has three sample arrays, or a prediction block of samples of a monochrome picture or a picture that is coded using three separate color planes and syntax used to predict the prediction block samples. Transform Unit (TU)—a transform block of luma samples, two corresponding transform blocks of chroma samples of a picture that has three sample arrays, or a transform block of samples of a monochrome picture or a picture that is coded using three separate color planes and syntax used to predict the transform block samples. Supplemental enhancement information (SEI)—extra information that may be inserted into a video bit-stream to enhance the use of the video. Luma—information indicating the brightness of an image sample. Chroma—information indicating the color of an image sample, which may be described in terms of red difference chroma component (Cr) and blue difference chroma component (Cb).

According to a first aspect the disclosure relates to an apparatus for intra prediction of a current video coding block of a frame of a video signal, wherein the current video coding block comprising a plurality of pixels and each pixel is associated with at least one pixel value (also referred to as sample value). The apparatus comprises: a reference pixel unit configured to generate on the basis of a plurality of primary reference pixel values a plurality of secondary reference pixel values, wherein the plurality of primary reference pixel values are associated with a plurality of primary reference pixels located in neighboring video coding blocks of the current video coding block, wherein the reference pixel unit is configured to generate each of the secondary reference pixel values on the basis of two or more of the primary reference pixel values; and an intra prediction unit configured to intra predict the pixel values of the pixels of the current video coding block on the basis of the plurality of primary reference pixel values and the plurality of secondary reference pixel values.

Thus, an improved apparatus for video coding is provided, which allows increasing the coding efficiency for intra prediction.

In a first possible implementation form of the apparatus according to the first aspect as such, the plurality of primary reference pixels are located in a row of pixels directly above the current video coding block and in a column of pixels to the left or to the right of the current video coding block, or wherein the plurality of primary reference pixels are located in a row of pixels directly below the current video coding block and in a column of pixels to the left or to the right of the current video coding block.

The current video coding block may in particular be rectangular, in particular quadratic.

In a second possible implementation form of the apparatus according to the first aspect as such or the first implementation form thereof, the plurality of secondary reference pixel values are associated with a plurality of secondary reference pixels located in further neighboring video coding blocks of the current video coding block, wherein the further neighboring video coding blocks are not the neighboring video coding blocks providing the primary reference pixel values providing the plurality of primary reference pixels. The apparatus will thus be particularly efficient.

In a third possible implementation form of the apparatus according to the first aspect as such or any one of the first and second implementation form thereof, the reference pixel unit is further configured to determine for each secondary reference pixel value of a subset of the plurality of secondary reference pixel values a first component of the secondary reference pixel value on the basis of directional intra prediction and a second component of the secondary reference pixel value on the basis of an interpolation prediction between a first secondary reference pixel value and a second secondary reference pixel value and to combine the first component of the secondary reference pixel value and the second component of the secondary reference pixel value to generate the secondary reference pixel value, wherein the first secondary reference pixel value and the second secondary reference pixel value are not part of the subset of the plurality of secondary reference pixel values. The apparatus will thus be particularly efficient.

As used herein interpolation prediction is based on interpolation methods for predicting a set of unknown values in given positions using a set of a known values. Interpolation consists in selecting a pre-defined function that approximates a set of known values and calculating values of this function at the positions of the unknown target values. Typical functions used for interpolation are linear, spline or cubic, and could be applied to the whole set of known values or have different parameters for different subsets of known values. The latter case is known as piecewise interpolation.

As used herein directional intra prediction is based on propagating boundary values inside a block to be predicted, so that each pixel value of the predicted block is calculated by projecting the position of that pixel onto a set of reference pixels in the specified direction. In case the projected position is a fractional, lies between pixel positions, sub-pixel interpolation prediction between neighboring pixels can be applied.

In a fourth possible implementation form of the apparatus according to the third implementation form of the first aspect, the reference pixel unit is configured to use a directional mode of the H.264 standard, the H.265 standard, or a standard evolved from one of these standards for determining the first component of the secondary reference pixel value on the basis of directional intra prediction.

In a fifth possible implementation form of the apparatus according to the third or fourth implementation form of the first aspect, the reference pixel unit is further configured to determine the first secondary reference pixel value on the basis of the primary reference pixel values of primary reference pixels neighboring the first secondary reference pixel and the second secondary reference pixel value on the basis of the primary reference pixel values of primary reference pixels neighboring the second secondary reference pixel. The apparatus will thus be particularly efficient.

In a sixth possible implementation form of the apparatus according to the fifth implementation form of the first aspect, the reference pixel unit is configured to determine the first secondary reference pixel value $p_{rsg}[0]$ and the second secondary reference pixel value $p_{rsg}[2N]$ on the basis of the following equations:

$$p_{rsg}[0]=w_{int} \cdot p_{int}[0]+w_{rs}[-N] \cdot p_{rs}[-N]+w_{rs}[-N-1] \cdot p_{rs}[-N-1]+w_{rs}[-N-2] \cdot p_{rs}[-N-2]$$

$$p_{rsg}[2N]=w_{int} \cdot p_{int}[2N]+w_{rs}[N] \cdot p_{rs}[N]+w_{rs}[N+1] \cdot p_{rs}[N+1]+w_{rs}[N+2] \cdot p_{rs}[N+2],$$

wherein N denotes the linear size of the current video coding block. The apparatus will thus be particularly efficient.

In a seventh possible implementation form of the apparatus according to any one of the third to sixth implementation form of the first aspect, the reference pixel unit is configured to determine the second component $p_{grad}[k]$ of the secondary reference pixel value on the basis of an interpolation prediction between the first secondary reference pixel value $p_{rsg}[0]$ and the second secondary reference pixel value $p_{rsg}[2N]$ on the basis of the following equation:

$$p_{grad}[k]=p_{rsg}[0]+k \cdot s,$$

with $$s = \frac{p_{rsg}[2N] - p_{rsg}[0]}{2N}.$$

The apparatus will thus be particularly efficient.

In an eighth possible implementation form of the apparatus according to any one of the third to seventh implementation form of the first aspect, the reference pixel unit is configured to combine the first component $p_{int}[k]$ of the secondary reference pixel value and the second component $p_{grad}[k]$ of the secondary reference pixel value to generate the secondary reference pixel value $p_{rs}[k]$ on the basis of the following equation:

$$p_{rs}[k]=w_{grad}[k] \cdot p_{grad}[k]+w_{int}[k] \cdot p_{int}[k]$$

wherein $w_{grad}[k]+w_{int}[k]=1$ and $0 \le w_{grad}[k], w_{int}[k] \le 1$. The apparatus will thus be particularly efficient.

In a ninth possible implementation form of the apparatus of the eighth implementation form of the first aspect, the reference pixel unit is configured to adjust the weights $w_{grad}[k]$ and/or $w_{int}[k]$ depending on the direction, on the index k and/or on the size of the current video coding block. The apparatus will thus be particularly efficient.

In a tenth possible implementation form of the apparatus according to the first aspect as such or any one of the preceding implementations forms thereof, the intra prediction unit is configured to intra predict the pixel values of the pixels of the current video coding block on the basis of the plurality of primary reference pixel values and the plurality of secondary reference pixel values on the basis of the following equation:

$$p[x,y]=w_0 \cdot p_{rs0}+w_1 \cdot p_{rs1},$$

wherein $p[x,y]$ denotes the pixel value of the pixel of the current video coding block having the coordinates x, y, $w_0$ denotes a first weight, $p_{rs0}$ denotes a primary reference pixel value, $w_1$ denotes a second weight, and $p_{rs1}$ denotes a secondary reference pixel value. The apparatus will thus be particularly efficient.

In an eleventh possible implementation form of the apparatus according to the tenth implementation form of the first aspect, the intra prediction unit is configured to intra predict the pixel values of the pixels of the current video coding block on the basis of the plurality of primary reference pixel values and the plurality of secondary reference pixel values on the basis of the following equation:

$$p[x, y] = \frac{d_{rs1}}{D} \cdot p_{rs0} + \frac{d_{rs0}}{D} \cdot p_{rs1},$$

wherein $d_{rs0}$ denotes the distance from the primary reference pixel associated with the primary reference pixel value $p_{rs0}$ to the pixel of the current video coding block having the coordinates x, y, $d_{rs1}$ denotes the distance from the secondary reference pixel associated with the secondary reference pixel value $p_{rs1}$ to the pixel of the current video coding block having the coordinates x, y, and D denotes the distance from the primary reference pixel associated with the primary reference pixel value $p_{rs0}$ to the secondary reference pixel associated with the secondary reference pixel value $p_{rs1}$, i.e. $D=d_{rs0}+d_{rs1}$. The apparatus will thus be particularly efficient.

According to a second aspect the disclosure relates to an encoding apparatus for encoding a current video coding block of a frame of a video signal, wherein the current video coding block comprises a plurality of pixels and each pixel is associated with a pixel value. The encoding apparatus comprises an intra prediction apparatus according to the first aspect as such or any one of the implementation forms thereof for providing a predicted video coding block; and an encoding unit configured to encode the current video coding block on the basis of the predicted video coding block.

According to a third aspect the disclosure relates to a decoding apparatus for decoding an encoded video coding block of a frame of a video signal, wherein the encoded video coding block comprises a plurality of pixels and each pixel is associated with a pixel value. The decoding apparatus comprises: an intra prediction apparatus according to the first aspect as such or any one of the implementation forms thereof for providing a predicted video coding block; and a restoration unit configured to restore a video coding block on the basis of an encoded video coding block and the predicted video coding block.

According to a fourth aspect the disclosure relates to a method for intra prediction of a current video coding block of a frame of a video signal, wherein the current video coding block comprises a plurality of pixels and each pixel is associated with a pixel value. The method comprises the steps of: generating on the basis of a plurality of primary reference pixel values a plurality of secondary reference pixel values, wherein the plurality of primary reference pixel values are associated with a plurality of primary reference pixels located in neighboring video coding blocks of the current video coding block and wherein each of the secondary reference pixel values is generated on the basis of two or more of the primary reference pixel values; and intra predicting the pixel values of the pixels of the current video coding block on the basis of the plurality of primary reference pixel values and the plurality of secondary reference pixel values.

The method according to the fourth aspect of the disclosure can be performed by the intra-prediction apparatus according to the first aspect of the disclosure. Further features of the method according to the fourth aspect of the disclosure result directly from the functionality of the intra-prediction apparatus according to the first aspect of the disclosure and its different implementation forms.

According to a fifth aspect the disclosure relates to a computer program comprising program code for performing the method according to the fourth aspect when executed on a computer.

The disclosure can be implemented in hardware, in software, or in a combination of hardware and software.

BRIEF DESCRIPTION OF THE DRAWINGS

Further embodiments of the disclosure will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
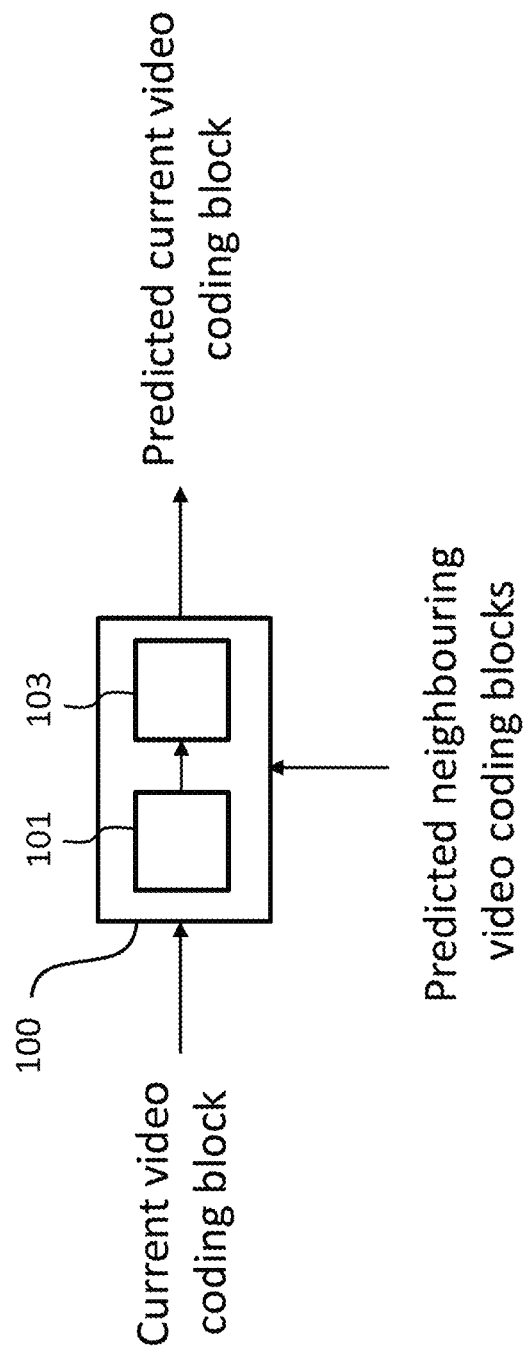
FIG. 1 shows a schematic diagram illustrating an intra-prediction apparatus according to an embodiment.

FIG. 1 shows a schematic diagram illustrating an intra prediction apparatus 100 according to an embodiment.

The intra prediction apparatus 100 is configured to intra predict a current video coding block of a frame of a video signal, wherein the current video coding block comprises a plurality of pixels and each pixel is associated with a pixel value.

The intra prediction apparatus 100 comprises a reference pixel unit 101 configured to generate on the basis of a plurality of primary reference pixel values a plurality of secondary reference pixel values, wherein the plurality of primary reference pixel values are associated with a plurality of primary reference pixels located in already predicted neighboring video coding blocks of the current video coding block. The reference pixel unit 101 is configured to generate each of the secondary reference pixel values on the basis of two or more of the primary reference pixel values.

Moreover, the intra prediction apparatus 100 comprises an intra prediction unit 103 configured to intra predict the pixel values of the pixels of the current video coding block on the basis of the plurality of primary reference pixel values and the plurality of secondary reference pixel values for providing a predicted current video coding block.

In an embodiment, the plurality of primary reference pixels are located in a row of pixels directly above the current video coding block and in a column of pixels to the left or to the right of the current video coding block. In a further embodiment, the plurality of primary reference pixels are located in a row of pixels directly below the current video coding block and in a column of pixels to the left or to the right of the current video coding block.

In an embodiment, the current video coding block is a quadratic video coding block or a rectangular video coding block.

In an embodiment, the plurality of secondary reference pixel values are associated with a plurality of secondary reference pixels located in further neighboring video coding blocks of the current video coding block, wherein the further neighboring video coding blocks are not the neighboring video coding blocks providing the plurality of primary reference pixels.

Further embodiments of the intra prediction apparatus 100 will be described further below.

Figure 2:
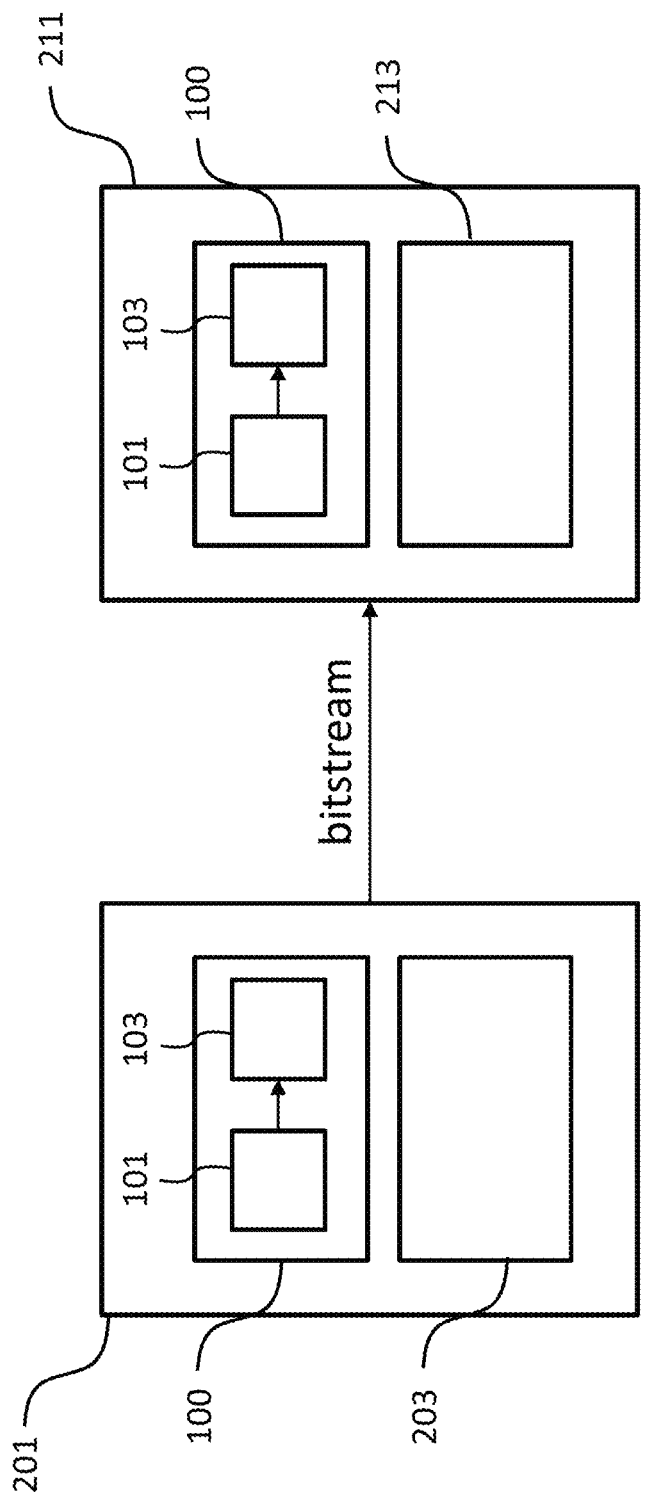
FIG. 2 shows a schematic diagram illustrating an encoding apparatus according to an embodiment and a decoding apparatus according to an embodiment.

FIG. 2 shows a schematic diagram illustrating an encoding apparatus 201 according to an embodiment and a decoding apparatus 211 according to an embodiment.

The encoding apparatus 201 is configured to encode a current video coding block of a frame of a video signal, wherein the current video coding block comprises a plurality of pixels and each pixel is associated with a pixel value. The encoding apparatus 201 comprises the intra prediction apparatus 100 shown in FIG. 1 for providing a predicted video coding block and an encoding unit 203 configured to encode the current video coding block on the basis of the predicted video coding block and providing the encoded current video coding block, for instance, in the form of a bitstream. Further embodiments of the encoding apparatus 201 will be described further below. In an embodiment, the encoding apparatus 201 could be implemented as a hybrid encoder, as defined, for instance, in the HEVC standard, and could comprise further components, such as an entropy encoder.

The decoding apparatus 211 is configured to decode the encoded video coding block of a frame of a video signal, which is contained in the bitstream provided by the encoding apparatus 201, wherein the encoded video coding block comprises a plurality of pixels and each pixel is associated with a pixel value. The decoding apparatus 211 comprises the intra prediction apparatus 100 shown in FIG. 1 for providing a predicted video coding block and a restoration unit 213 configured to restore a video coding block on the basis of the encoded video coding block and the predicted video coding block. Further embodiments of the decoding apparatus 211 will be described further below. In an embodiment, the decoding apparatus 211 could be implemented as a hybrid decoder, as defined, for instance, in the HEVC standard, and could comprise further components, such as a decoding unit for providing a residual video coding block on the basis of the encoded video coding block.

Figure 3:
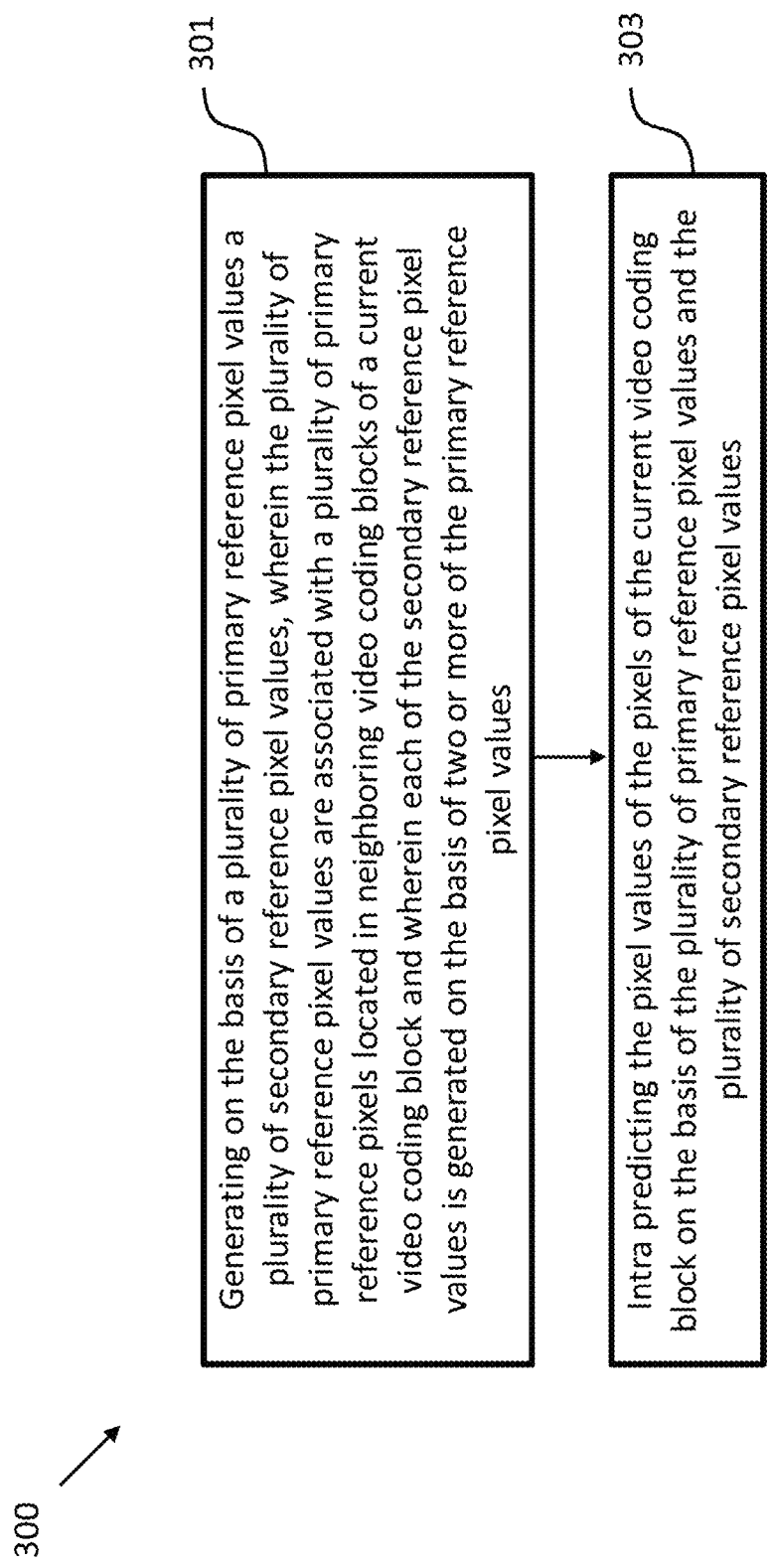
FIG. 3 shows a schematic diagram illustrating an intra-prediction method according to an embodiment.

FIG. 3 shows a schematic diagram illustrating a method 300 for intra prediction of a current video coding block of a frame of a video signal according to an embodiment, wherein the current video coding block comprises a plurality of pixels and each pixel is associated with a pixel value.

The intra prediction method 300 comprises a step 301 of generating on the basis of a plurality of primary reference pixel values a plurality of secondary reference pixel values, wherein the plurality of primary reference pixel values are associated with a plurality of primary reference pixels located in neighboring video coding blocks of the current video coding block and wherein each of the secondary reference pixel values is generated on the basis of two or more of the primary reference pixel values.

Moreover, the intra prediction method 300 comprises a step 303 of intra predicting pixel values of the pixels of the current video coding block on the basis of the plurality of primary reference pixel values and the plurality of secondary reference pixel values.

Further embodiments of the intra prediction method 300 will be described further below.

As will be described in the following in the context of FIG. 4, in an embodiment, the reference pixel unit 101 of the intra prediction apparatus 100 is further configured to determine for each secondary reference pixel value of a subset of the plurality of secondary reference pixel values a first component of the secondary reference pixel value on the basis of directional intra prediction and a second component of the secondary reference pixel value on the basis of an interpolation prediction between a first secondary reference pixel value and a second secondary reference pixel value and to combine the first component of the secondary reference pixel value and the second component of the secondary reference pixel value to generate the secondary reference pixel value, wherein the first secondary reference pixel value and the second secondary reference pixel value are not part of the subset of the plurality of secondary reference pixel values.

Figure 4:
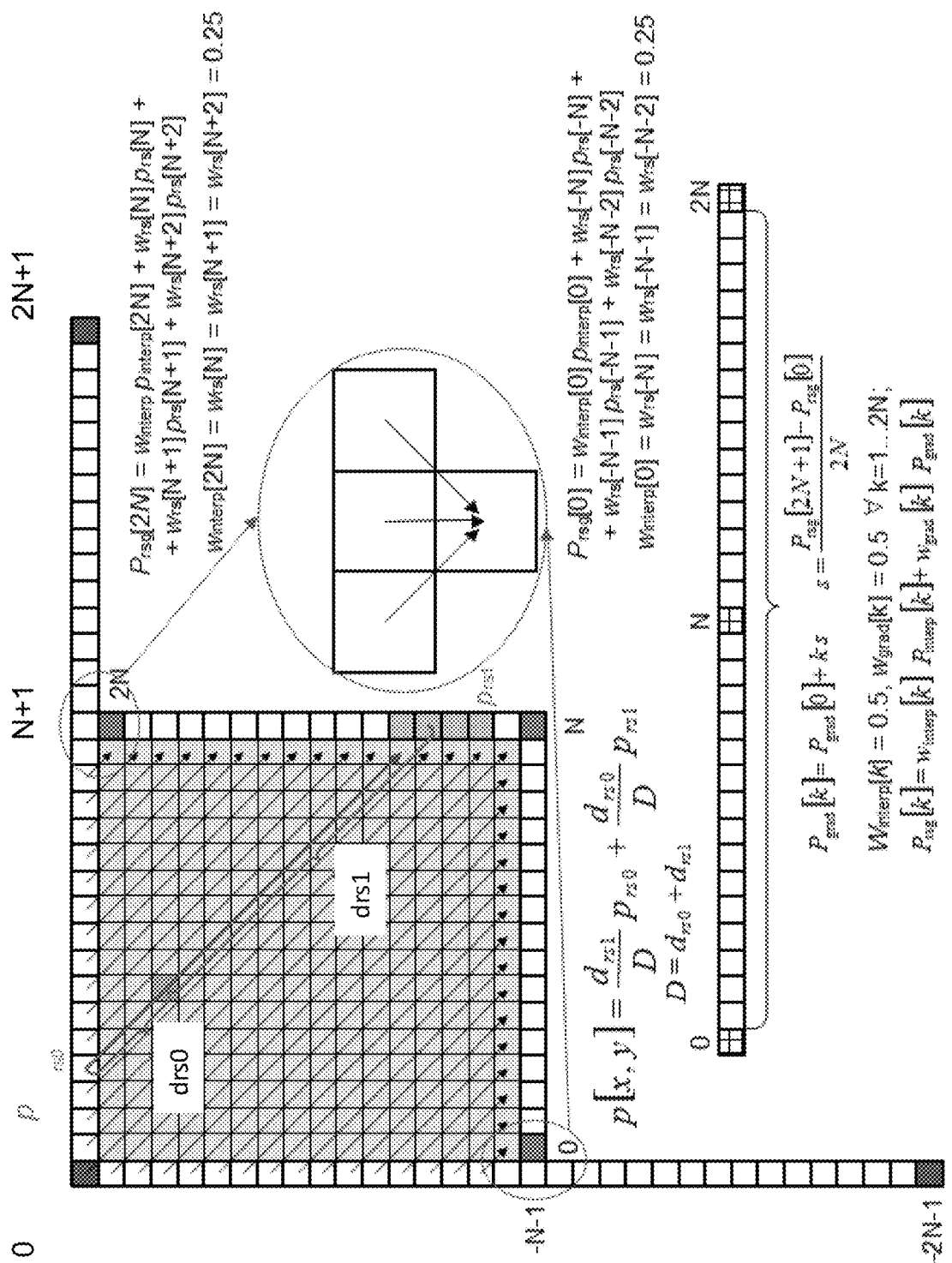
FIG. 4 shows a schematic diagram of a video coding block illustrating several aspects of an intra-prediction apparatus according to an embodiment.

FIG. 4 shows a schematic diagram of an exemplary current video coding block illustrating several aspects of the intra prediction apparatus 100 and the intra prediction method 300 according to an embodiment, in particular the relationship between primary reference pixels, secondary reference pixels and intra predicted pixels. The corresponding processing steps implemented in the intra prediction apparatus 100 and the intra prediction method 300 according to an embodiment are shown in FIG. 6.

In FIG. 4 the grey square of pixels represents the exemplary currently processed video coding block. For the exemplary current video coding block shown in FIG. 4 the primary reference pixels are the pixels in the row of pixels above the current video coding block and the pixels in the column of pixels to the left of the current video coding block. Thus, in the embodiment shown in FIG. 4, the primary reference pixels belong to neighboring video coding blocks, which already have been intra predicted, i.e. processed by the intra prediction apparatus 100. In FIG. 4 the primary reference pixels in the row above the current video coding block are indexed from 0 to 2N and the primary reference pixels in the column of pixels to the left of the current video coding block are indexed from 0 to −2N.

FIG. 4 illustrates as an example the case, where the intra prediction apparatus 100 intra predicts the pixel value of the pixel of the currently processed video coding block, i.e. the currently processed pixel, which is identified in FIG. 4 by a darker shade of grey. For the intra prediction mode having an exemplary direction of 45° assumed in FIG. 4 the reference pixel unit 101 is configured to determine the primary reference pixel $p_{rs0}$ associated with the currently processed pixel. Moreover, the secondary reference pixel $p_{rs1}$ on the "opposite side" of the currently processed pixel is determined (this is also illustrated in the processing steps 601, 603 and 605 of FIG. 6). The position of the secondary reference pixel $p_{rs1}$ depends on the intra-prediction mode, the size of the block to be predicted and the position of the currently processed pixel being predicted. If this position does not coincide with a primary (i.e. already predicted) reference pixel (see also processing step 603 of FIG. 6), the corresponding secondary reference pixel value will be determined as follows.

Figure 6:
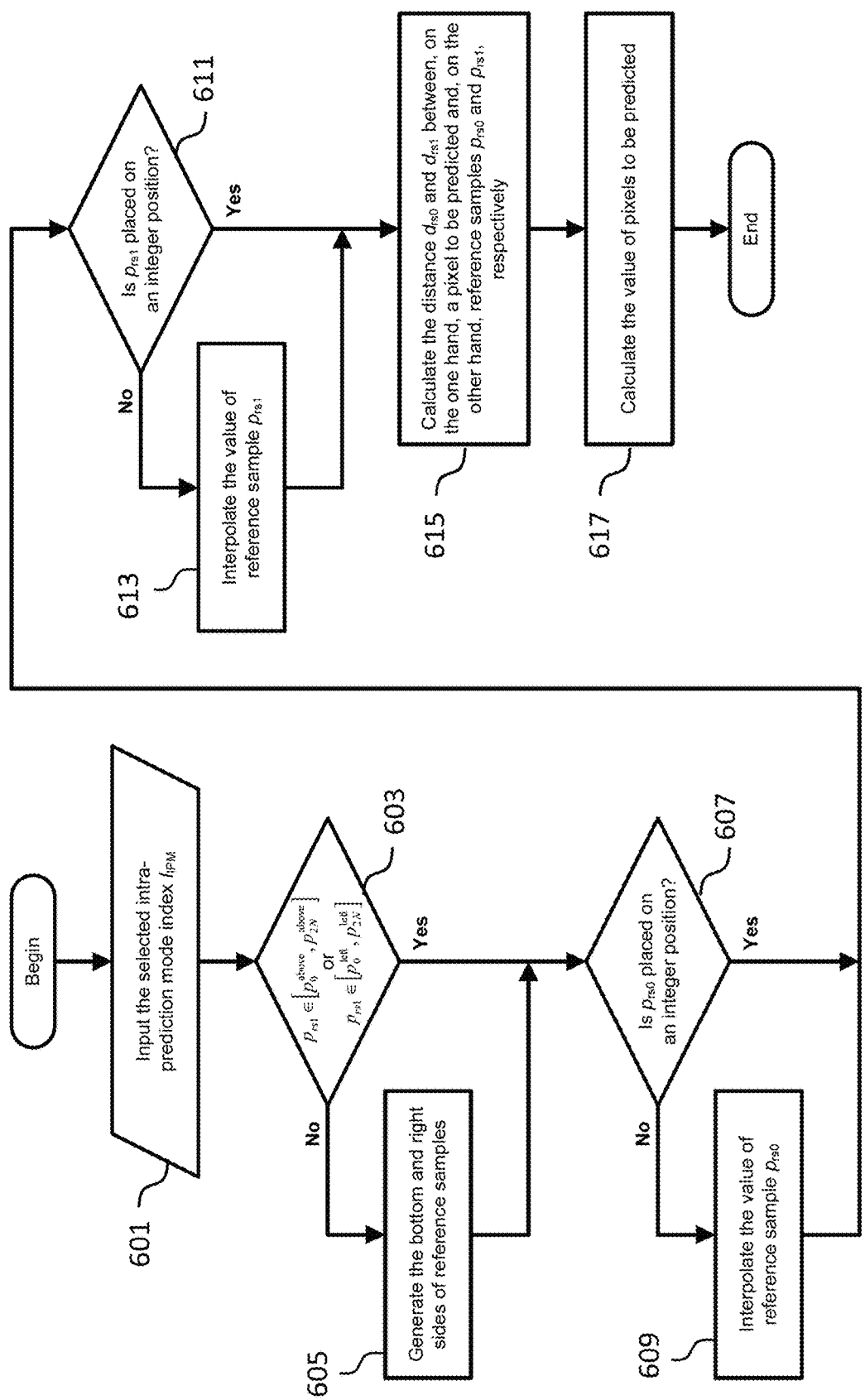
FIG. 6 shows a diagram illustrating intra-prediction processing steps implemented in an intra-prediction apparatus according to an embodiment.

The primary reference pixel $p_{rs0}$ and/or the secondary reference pixel $p_{rs1}$ might not be located at integer pixel position and, therefore, may require a sub-pixel interpolation process, e.g. as defined by HEVC standard (see also processing steps 607, 609, 611 and 613 of FIG. 6).

In a next stage, the intra prediction unit 103 of the apparatus 100 is configured to intra predict the pixel value of the currently processed pixel on the basis of the primary reference pixel value $p_{rs0}$ and the secondary reference pixel value $p_{rs1}$.

In an embodiment, the intra prediction unit 103 of the apparatus 100 is configured to intra predict the pixel value of the currently processed pixel as a weighted sum of the primary reference pixel value $p_{rs0}$ and the secondary reference pixel value $p_{rs1}$, i.e.:

$$p[x,y] = w_0 \cdot p_{rs0} + w_1 \cdot p_{rs1},$$

wherein p[x,y] denotes the pixel value of the currently processed pixel located at the coordinates x, y, $w_0$ denotes a first weight and $w_1$ denotes a second weight.

In the embodiment shown in FIG. 4, the intra prediction unit 103 is configured to determine the first and the second weight $w_0$, $w_1$ on the basis of the distance $d_{rs0}$ between the primary reference pixel $p_{rs0}$ and the currently processed pixel, the distance $d_{rs1}$ between the secondary reference pixel $p_{rs1}$ and the currently processed pixel and the distance D between the primary reference pixel $p_{rs0}$ and the secondary reference pixel $p_{rs1}$, i.e. $D = d_{rs0} + d_{rs1}$ (see also processing steps 615 and 617 in FIG. 6). More specifically, in an embodiment the intra prediction unit 103 is configured to intra predict the pixel value of the currently processed pixel on the basis of the following equation:

$$p[x, y] = \frac{d_{rs1}}{D} \cdot p_{rs0} + \frac{d_{rs0}}{D} \cdot p_{rs1}.$$

The embodiment shown in FIG. 4 uses the generation of secondary reference samples, i.e. pixel values, for the unknown sides of the currently processed video coding block. In the HEVC standard, for instance, the unknown sides are the right side and the bottom side of the currently processed video coding block.

Figure 5:
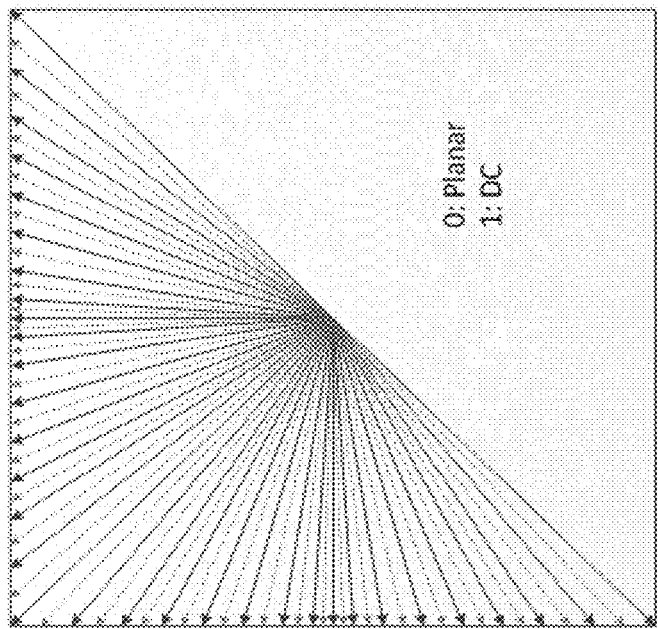
FIG. 5 shows a schematic diagram of a video coding block illustrating different directional intra prediction modes, which could be implemented in an intra-prediction apparatus according to an embodiment.

FIG. 5 shows the intra prediction modes provided by the HEVC/H.265 standard, including a planar mode (the intra-prediction mode index is 0), DC mode (the intra-prediction mode index is 1), and 33 directional modes (the intra-prediction mode index ranges from 2 to 34). In the following embodiments of the intra prediction apparatus 100 and the intra prediction method 300 will be described, which can use one or more of the directional modes shown in FIG. 5 to generate a secondary reference pixel value on the basis of at least two primary reference pixel values.

Figure 7:
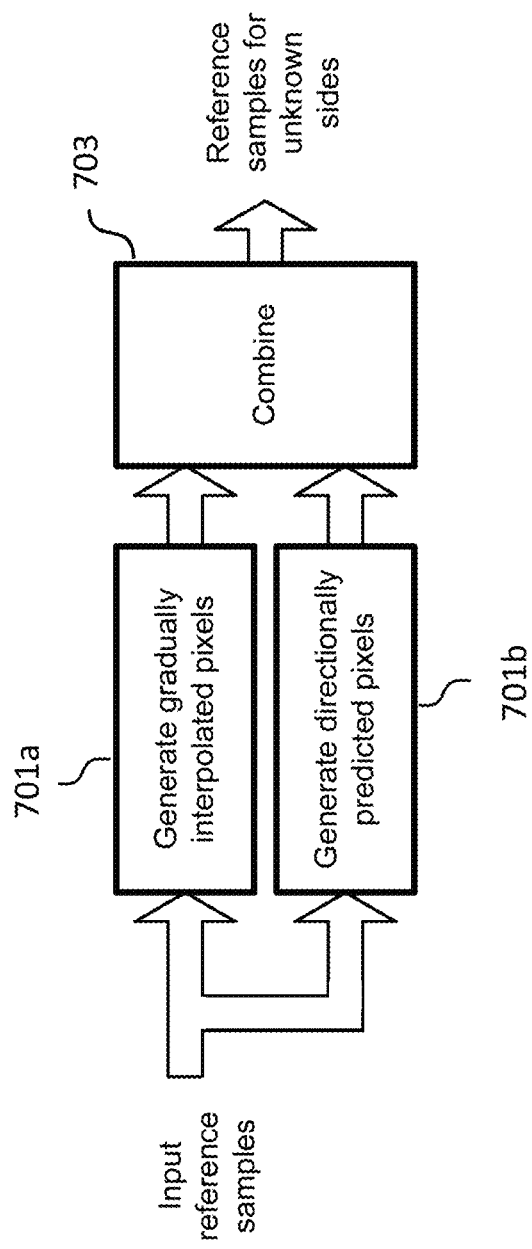
FIG. 7 shows a diagram illustrating intra-prediction processing steps implemented in an intra-prediction apparatus according to an embodiment.

FIG. 7 shows a schematic diagram illustrating a general concept implemented in the reference pixel unit 101 of an apparatus 100 according to an embodiment for generating the secondary reference pixels. The reference pixel unit 101 according to embodiments of the disclosure uses a combination of two components, namely gradually interpolated pixel values or components and directionally predicted pixel values or components, i.e. pixels predicted on the basis of a directional prediction, as provided, for instance, by the 33 directional modes defined in the HEVC/H.265 standard.

As illustrated in FIG. 7, according to embodiments of the disclosure these two components can be computed independently and combined in order to obtain the secondary reference samples $p_{rs1}$ directly or by means of an interpolation of these values. According to embodiments of the disclosure, directionally predicted values are calculated the same way as if these pixels would belong to the block being predicted, i.e. the pixels "inside" of the currently processed video coding block. The combination of these two components can be performed in different ways.

In an embodiment, the reference pixel unit 101 is configured to take a weighted sum of the first component, i.e. the directionally predicted pixel value, and the second component, i.e. the gradually interpolated pixel value, for generating a secondary reference pixel value on the basis of the following equation:

$$p_{rs}[k] = w_{grad}[k] \cdot p_{grad}[k] + w_{int}[k] \cdot p_{int}[k]$$

wherein $w_{grad}[k] + w_{int}[k] = 1$ and $0 \leq w_{grad}[k], w_{int}[k] \leq 1$ and k denotes the index for identifying the secondary reference pixel values. For instance, in figure the index k runs from 0 (secondary reference pixel to the left in the bottom row) to 2N (secondary reference pixel at the top in the row on the right side of the currently processed video coding block). In an embodiment, the weights $w_{grad}[k]$, $w_{int}[k]$ can have the value 0.5. In an embodiment, the weights $w_{grad}[k]$, $w_{int}[k]$ can depend on the size of the current video coding block and/or the selected directional mode. In an embodiment, the weight $w_{grad}[k]$ can have the values provided in the following table (wherein the weight $w_{int}[k]$ can be derived from the relation $w_{grad}[k] + w_{int}[k] = 1$ and the numbers defining the respective angular mode range are indexes identifying different directional modes):

| Angular mode | Block size | | |
|---|---|---|---|
| range | 8 × 8 | 16 × 16 | 32 × 32 |
| [2; 14) | 0.75 | 0.75 | 0.5 |
| [14; 26) | 1.0 | 1.0 | 0.75 |
| [26; 38) | 0.75 | 0.75 | 1.0 |
| [38; 50) | 0.5 | 0.0 | 0.25 |
| [50; 67) | 0.5 | 0.0 | 1.0 |

In another embodiment, the reference pixel unit 101 is configured to generate the secondary pixel values $p_{rs}[k]$ by blending (which can include non-linear operations) the first components, i.e. the directionally predicted pixel values, and the second components, i.e. the gradually interpolated pixel values.

Figure 8:
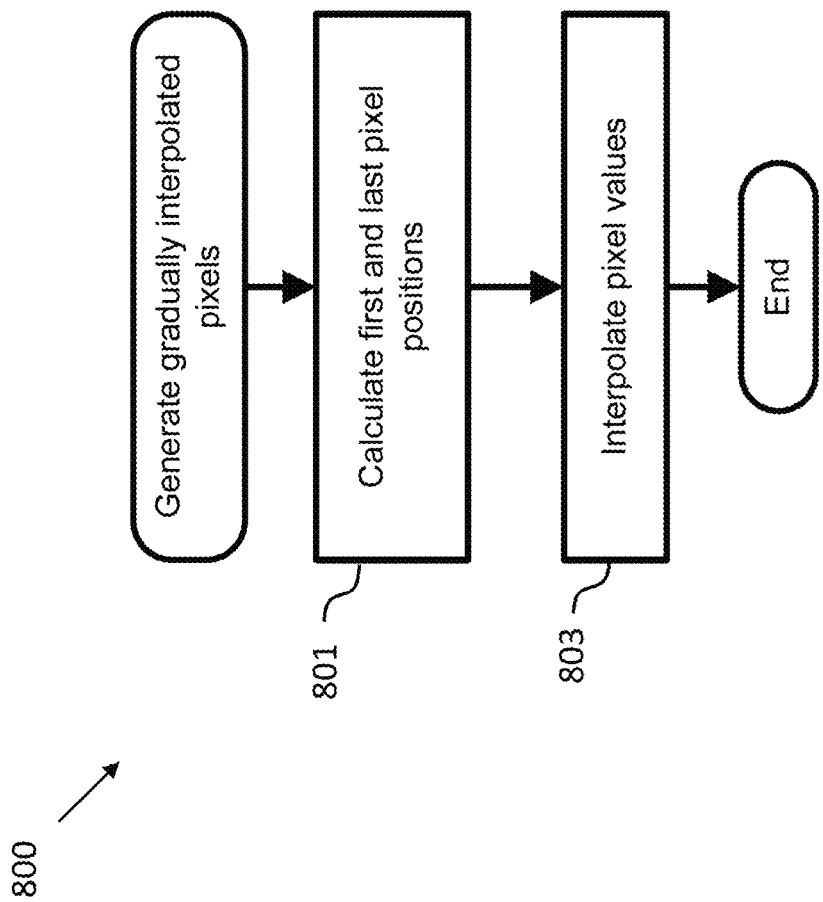
FIG. 8 shows a diagram illustrating intra-prediction processing steps implemented in an intra-prediction apparatus according to an embodiment.

FIG. 8 shows a diagram illustrating intra-prediction processing steps implemented in the intra-prediction apparatus 100 according to an embodiment, which is based on a two-stage process 800 for generating the gradually interpolated pixel values.

In a first processing stage 801, the reference pixel unit 101 is configured to determine the secondary pixel values of a first and second (or last) secondary reference pixels, wherein the first and the last secondary reference pixels are those secondary reference pixels that are adjacent to the primary reference pixels. For the exemplary scenario shown in FIG. 4 the first secondary reference pixel (being associated with a pixel value $p_{rs}[0]$) is the most left pixel in the bottom row and the last secondary reference pixel (being associated with a pixel value $p_{rs}[2N]$) is the top pixel in the row on the right hand side of the currently processed video coding block.

In an embodiment, the reference pixel unit 101 is configured to determine the first secondary reference pixel value $p_{rsg}[0]$ and the second secondary reference pixel value $p_{rsg}[2N]$ on the basis of the following equations:

$$p_{rsg}[0] = w_{int} \cdot p_{int}[0] + w_{rs}[-N] \cdot p_{rs}[-N] + w_{rs}[-N-1] \cdot p_{rs}[-N-1] + w_{rs}[-N-2] \cdot p_{rs}[-N-2]$$

$$p_{rsg}[2N] = w_{int} \cdot p_{int}[2N] + w_{rs}[N] + p_{rs}[N] + w_{rs}[N+1] + p_{rs}[N+1] + w_{rs}[N+2] \cdot p_{rs}[N+2],$$

wherein $p_{rs}$ denotes the pixel value of a respective primary reference pixel and $w_{rs}$ denotes a primary reference pixel weight.

The second processing stage 803 of the process shown in FIG. 8 can be done in different ways. In an embodiment, the reference pixel unit 101 of the apparatus 100 is configured to generate the gradually interpolated pixel values, i.e. the respective second component for generating the respective secondary reference pixel value $p_{rs}[k]$ using linear interpolation. In an embodiment, the reference pixel unit 101 of the apparatus 100 is configured to determine the value of a step size on the basis of the following equation:

$$s = \frac{p_{rsg}[2N] - p_{rsg}[0]}{2N}$$

and to use this value for the step size s to compute the gradually interpolated values:

$$p_{grad}[k] = p_{grad}[0] + k \cdot s.$$

In another embodiment, the reference pixel unit 101 of the apparatus 100 is configured to define an average pixel value of the first and the last of the gradually interpolated pixels, for instance, on the basis of the following equation:

$$\frac{p_{rsg}[0] + p_{rsg}[2N]}{2}.$$

Figure 9:
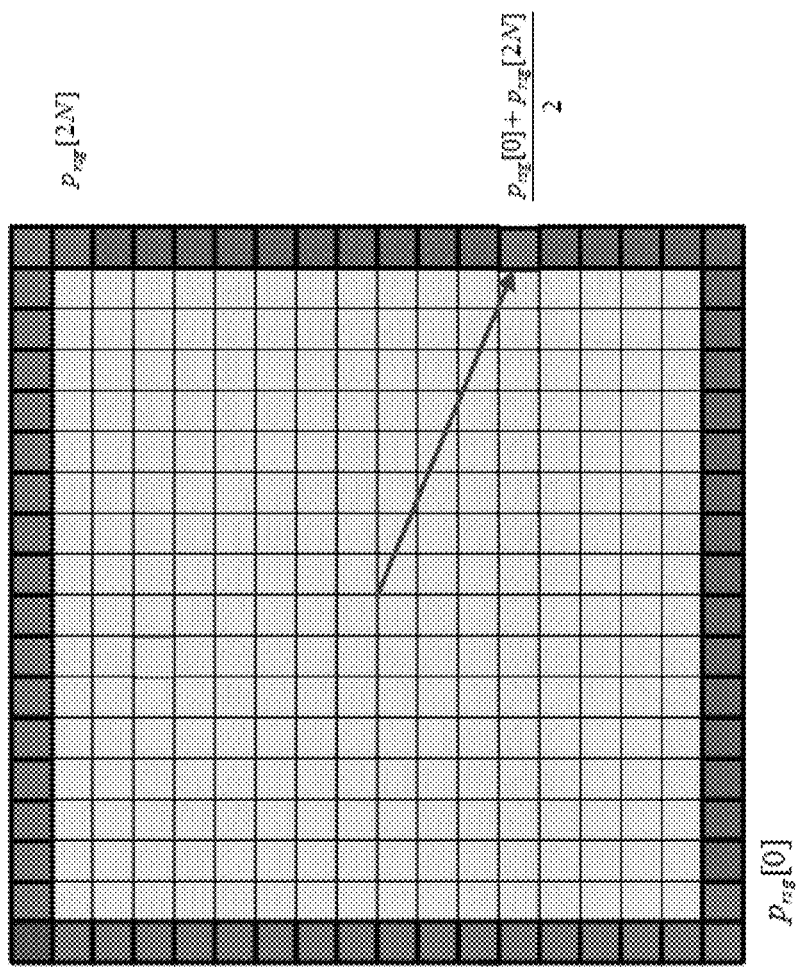
FIG. 9 shows a schematic diagram of a video coding block illustrating an aspect of an intra-prediction apparatus according to an embodiment.

In an embodiment, which is illustrated on the basis of the exemplary video coding block shown in FIG. 9, the reference pixel unit 101 of the apparatus 100 is configured to determine a corresponding secondary reference pixel for this average pixel value by projecting of the point located at the middle of the currently processed video coding block to the positions of the secondary pixels. The coordinates of the point located at the middle of the currently processed video coding block can be expressed as follows:

$$(x, y) = \left(\frac{W}{2}, \frac{H}{2}\right),$$

wherein W and H denote the width and height of the currently processed video coding block, respectively. For this embodiment, the second processing stage 803 shown in FIG. 8 becomes dependent on the intra-prediction mode used for predicting the first components, i.e. the directionally predicted pixel values, of the secondary reference pixel values, because the interpolation is performed taking into account the position of the secondary reference pixel associated with the average pixel value. In further embodiments, two different step size values could be used by the reference pixel unit 101 to perform linear interpolation between the points, namely:

$$\left(p_{rsg}[0], \frac{p_{rsg}[0] + p_{rsg}[2N]}{2}\right] \text{ and } \left[\frac{p_{rsg}[0] + p_{rsg}[2N]}{2}, p_{rsg}[2N]\right).$$

In further embodiments, the reference pixel unit 101 can be configured to use instead of a linear interpolation a 2-nd or higher order interpolation for determining the gradually interpolated pixel values in the interval ($p_{rsg}[0]$, $p_{rsg}[2N]$).

Figure 10:
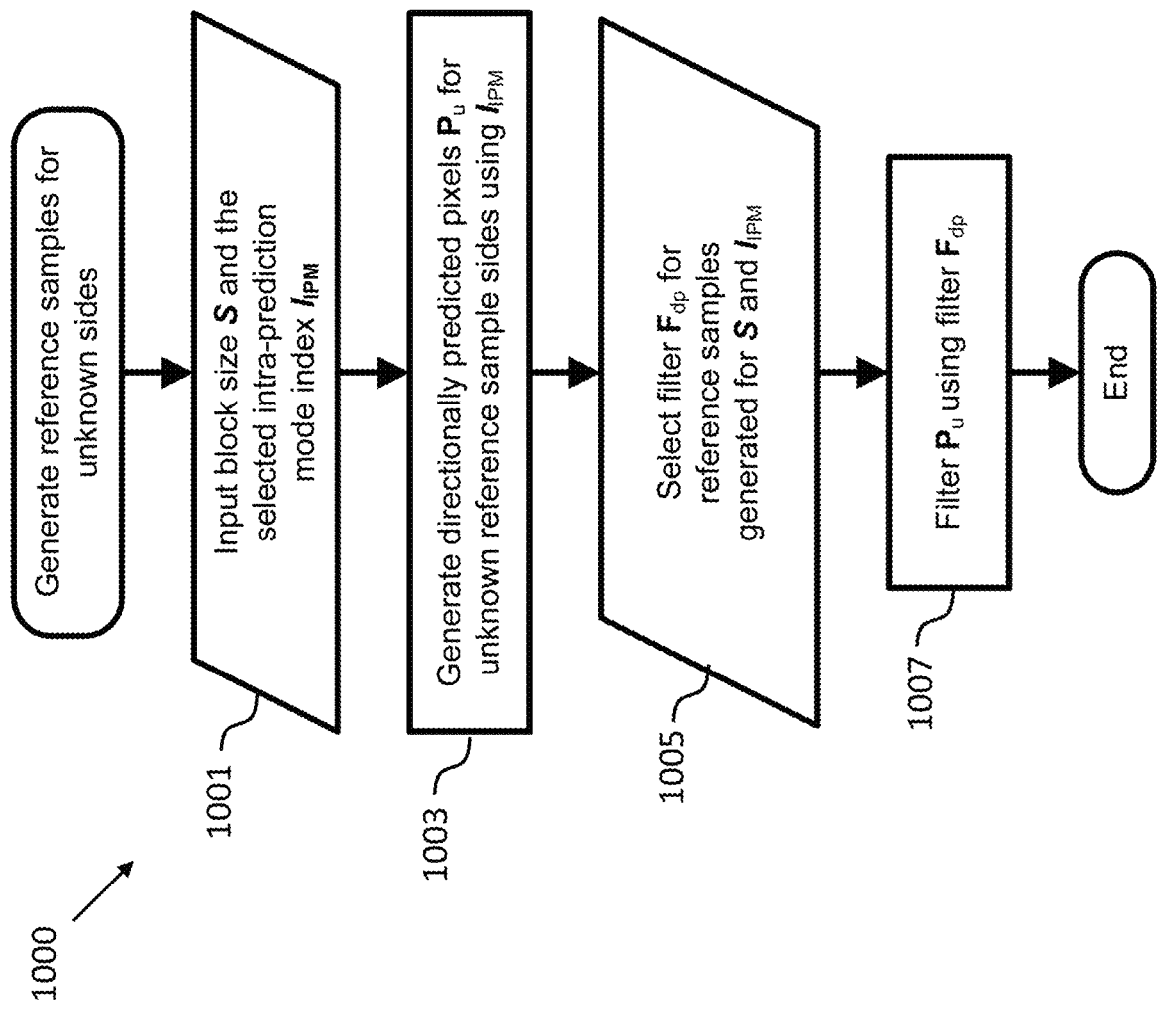
FIG. 10 shows a diagram illustrating intra-prediction processing steps implemented in an intra-prediction apparatus according to an embodiment.

FIG. 10 illustrates an algorithm implemented in the reference pixel unit 101 according to further embodiments for generating the secondary reference pixel values and/or as an alternative to the processing step 803 shown in FIG. 8.

In a first processing step 1001 of the algorithm shown in FIG. 10 a size S of the currently processed video coding block to be predicted and an intra prediction mode $I_{IPM}$ are selected. In the next processing step 1003 is directionally predicted pixels $P_u$ are generated for the unknown reference sample sides using the intra prediction mode $I_{IPM}$ selected in processing step 1001. In an embodiment, the reference pixel unit 101 is configured to provide one or more conventional intra prediction mechanisms (e.g. the conventional intra prediction mechanisms defined in the standard H.265) for selection and use in processing step 1003 of FIG. 10. In embodiments of the disclosure the processing step 1003 can include a filtering or no filtering of the primary reference pixel values used for generating the secondary reference pixel values.

After the secondary reference pixels have been directionally generated, the reference pixel unit 101 of the apparatus can be configured to filter these secondary reference pixels by a filter $F_{dp}$ in a processing step 1007, wherein the reference pixel unit 101 can be configured to select the filter $F_{dp}$ according to the size S of the currently processed video coding block, i.e. the block to be predicted, and/or the selected intra prediction mode $I_{IPM}$. (see processing step 1005 in FIG. 10). In embodiments of the disclosure, the $F_{dp}$ filter applied in processing step 1007 could differ from the one optionally applied to the primary reference samples in processing step 1003.

In an embodiment, the reference pixel unit 101 can be configured to select the filter $F_{dp}$ in processing step 1005 to be stronger than the filters specified in the H.265 standard to filter known reference samples. However, it is possible to apply different filters $F_{dp}$, including but not limiting to FIR, IIR, non-linear or median filters. These filters may provide different effects including blurring, de-ringing or sharpening.

In the following sections further embodiments of the encoding apparatus 201 and the decoding apparatus 211 will be described, including the signaling between the apparatus 201 and the decoding apparatus 211 as implemented by embodiments of the disclosure. As will be appreciated, embodiments of the disclosure do not require a special signaling at the side of the decoding apparatus 211 and, therefore, do not increase the complexity of bitstream parsing operations.

Figure 11:
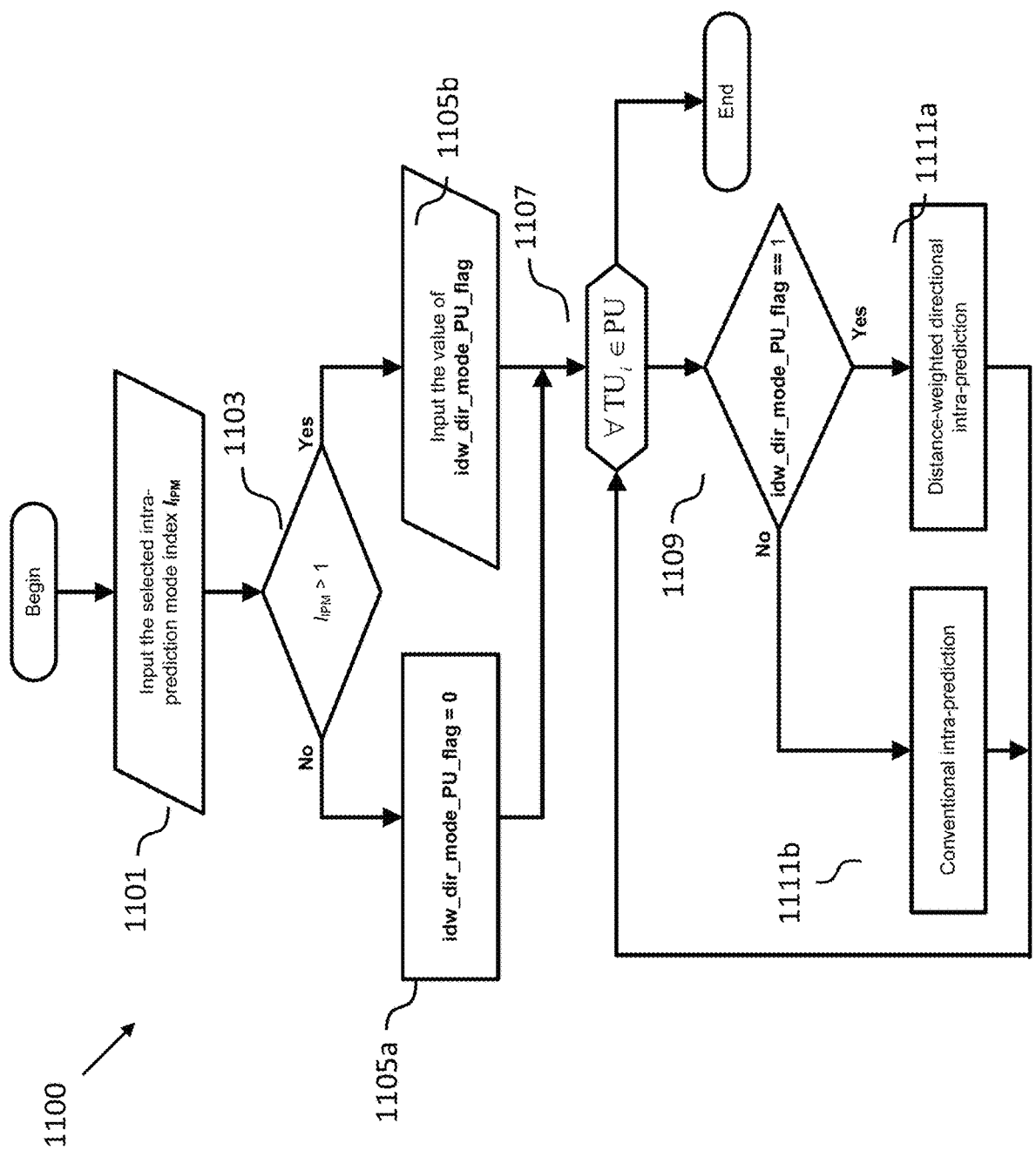
FIG. 11 shows a diagram illustrating processing steps implemented in a decoding apparatus according to an embodiment.

FIG. 11 shows a processing scheme 1100 implemented in the decoding apparatus 211 according to an embodiment based on the HEVC standard.

In a first processing step 1101 the index of the intra prediction mode $I_{IPM}$ is parsed from the bitstream. Thereafter, in processing step 1103 a decision is taken depending on whether the decoded intra prediction mode is a directional intra prediction mode. In the case the signaling scheme is applied in the context of HEVC video coding, the intra prediction mode is directional when $I_{IPM}$ is greater than 1. Embodiments of the disclosure can make use of the planar mode as well. In such a case, this condition can be written as $I_{IPM}$ is not equal to 1.

For directional (and possibly planar) intra prediction modes the value of the flag "idw_dir_mode_PU_flag" is parsed from the bitstream in processing step 1105b. According to embodiments of the disclosure this flag is introduced into the bitstream to code whether to apply the proposed mechanism to the prediction unit (a set of transform units). In an embodiment, the value of this flag is assigned to 0 for non-directional (DC and PLANAR) intra prediction modes in step 1105a. In processing step 1107, TUs belonging to a PU are determined, and for each TU a decision is taken (processing step 1109) to use either a conventional prediction scheme (processing step 1111b) or the distance-weighted prediction (processing step 1111a), as provided by embodiments of the disclosure, for obtaining the predicted signal. The decision for a TU in processing step 1109 is taken on the basis of the value of the flag "idw_dir_mode_PU_flag", which has been determined in processing steps 1105a and 1105b.

Figure 12:
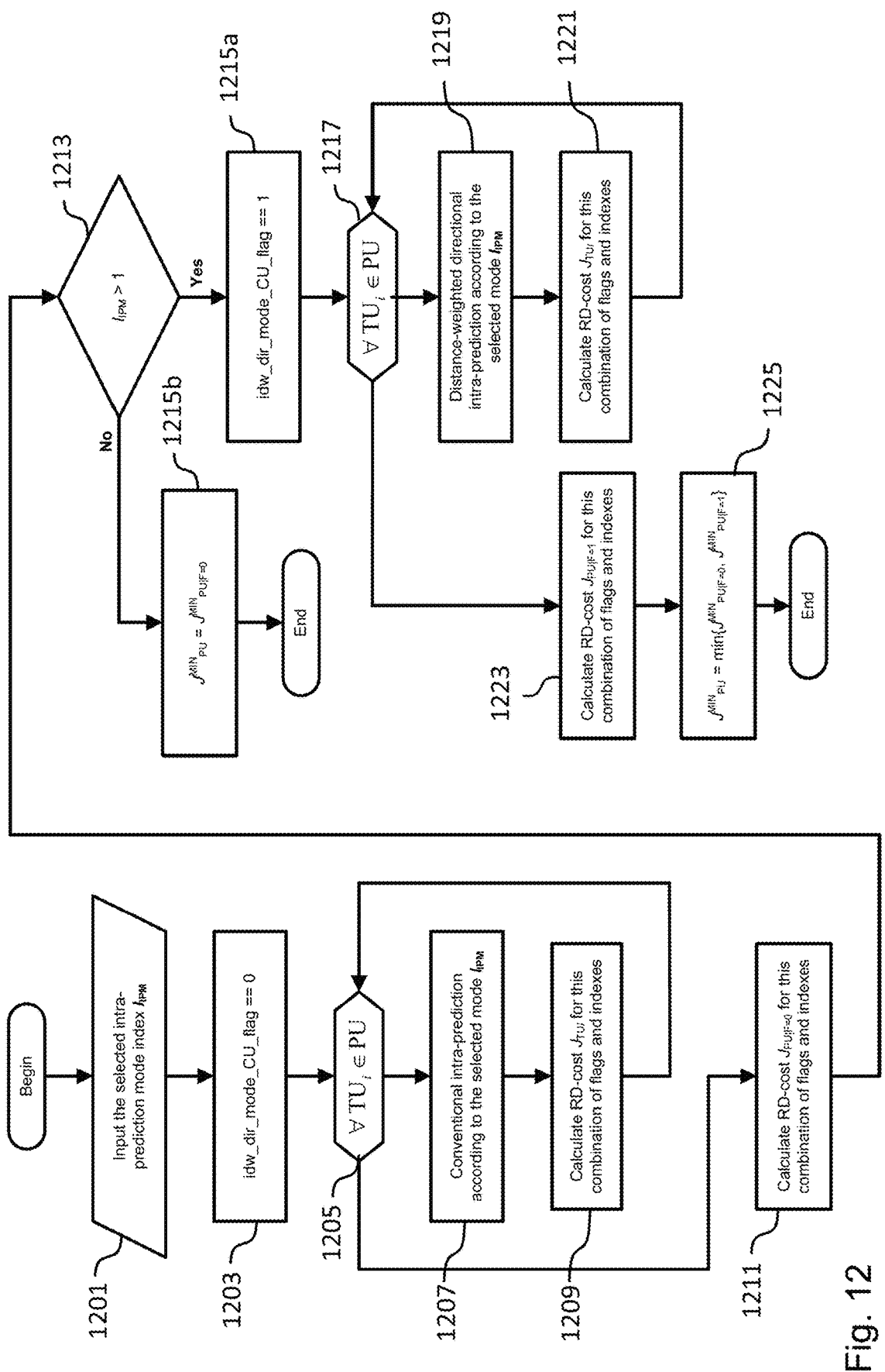
FIG. 12 shows a diagram illustrating processing steps implemented in a decoding apparatus according to an embodiment.

FIG. 12 shows a processing scheme 1200 implemented in the encoding apparatus 201 according to an embodiment based on the HEVC standard.

The processing scheme 1200 starts in a processing step 1201 by selecting an intra prediction mode out of the set of candidate intra prediction modes for the given PU. Then, the flag "idw_dir_mode_PU_flag" is assigned to a value of 0 (see processing step 1203), which means that distance-weighted directional prediction (DWDIP) is not applied within the PU. For each TU of the PU a rate-distortion cost (RD-cost) is estimated (see processing steps 1205, 1207, 1209). A PU coding cost could be estimated by summing up the RD-costs for the TUs and adding signaling costs (see processing step 1211).

If the intra-prediction mode picked up from candidate intra prediction modes list is not directional, there are no further calculations: the RD-cost for the given PU and intra-prediction mode is determined (see processing steps 1213 and 1215b). Otherwise, similar operations (see processing steps 1215a, 1217, 1219, 1221 and 1223) are performed for the case when the flag "idw_dir_mode_PU_flag" is set to 1, i.e. DWDIP is enabled for the given PU. The decision by the encoding apparatus 201 about which value of the flag "idw_dir_mode_PU_flag" should be used can be made by comparing RD-costs (see processing step 1215).

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure makes reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. An apparatus for intra prediction of a current video coding block of a frame of a video signal, the current video coding block comprising a plurality of pixels, each pixel associated with a pixel value, the apparatus comprising processing circuitry configured to:
    generate, based on a plurality of primary reference pixel values, a plurality of secondary reference pixel values, wherein the plurality of primary reference pixel values are associated with a plurality of primary reference pixels located in neighboring video coding blocks of the current video coding block, wherein each of the secondary reference pixel values is generated based on two or more of the primary reference pixel values;
    intra predict the pixel values of the pixels of the current video coding block based on the plurality of primary reference pixel values and the plurality of secondary reference pixel values;
    determine, for each secondary reference pixel value of a subset of the plurality of secondary reference pixel values, a first component of the secondary reference pixel value based on directional intra prediction;
    determine, for each secondary reference pixel value of the subset of the plurality of secondary reference pixel values, a second component of the secondary reference pixel value based on an interpolation prediction between a first secondary reference pixel value and a second secondary reference pixel value; and
    for each secondary reference pixel value of the subset of the plurality of secondary reference pixel values, combine the first component of the secondary reference pixel value and the second component of the secondary reference pixel value to generate the secondary reference pixel value, wherein the first secondary reference pixel value and the second secondary reference pixel value are not part of the subset of the plurality of secondary reference pixel values.

2. The apparatus of claim 1,
    wherein the plurality of primary reference pixels are located in a row of pixels directly above the current video coding block and in a column of pixels to the left or to the right of the current video coding block.

3. The apparatus of claim 1, wherein the plurality of secondary reference pixel values are associated with a plurality of secondary reference pixels located in other video coding blocks of the current video coding block, wherein the other video coding blocks are not the neighboring video coding blocks.

4. The apparatus of claim 1, wherein the processing circuitry is configured to use a directional mode of a H.264 standard, a H.265 standard, or a standard evolved from the H.264 or the H.265 standards for determining the first component of the secondary reference pixel value based on directional intra prediction.

5. The apparatus of claim 1, wherein the processing circuitry is further configured to:
    determine the first secondary reference pixel value based on the primary reference pixel values of primary reference pixels neighboring the first secondary reference pixel; and
    determine the second secondary reference pixel value based on the primary reference pixel values of primary reference pixels neighboring the second secondary reference pixel.

6. The apparatus of claim 5, wherein the processing circuitry is configured to determine, for each secondary reference pixel value of the subset of the plurality of secondary reference pixel values, the first secondary reference pixel value $p_{rsg}[0]$ and the second secondary reference pixel value $p_{rsg}[2N]$ based on the following equations:

$$p_{rsg}[0]=w_{int} \cdot p_{int}[0]+w_{rs}[-N] \cdot p_{rs}[-N]+w_{rs}[-N-1] \cdot p_{rs}[-N-1]+w_{rs}[-N-2] \cdot p_{rs}[-N-2]$$

and $$p_{rsg}[2N]=w_{int} \cdot p_{int}[2N]+w_{rs}[N] \cdot p_{rs}[N]+w_{rs}[N+1] \cdot p_{rs}[N+1]+w_{rs}[N+2] \cdot p_{rs}[N+2],$$

wherein N denotes a linear size of the current video coding block.

7. The apparatus of claim 1, wherein the processing circuitry is configured to determine, for each secondary reference pixel value of the subset of the plurality of secondary reference pixel values, the second component $p_{grad}[k]$ of the secondary reference pixel value based on an interpolation prediction between the first secondary reference pixel value $p_{rsg}[0]$ and the second secondary reference pixel value $p_{rsg}[2N]$ based on the following equation:

$$p_{grad}[k] = p_{rsg}[0] + k \cdot s,$$
$$\text{with } s = \frac{p_{rsg}[2N] - p_{rsg}[0]}{2N}.$$

8. The apparatus of claim 1, wherein the processing circuitry is configured to combine, for each secondary reference pixel value of the subset of the plurality of secondary reference pixel values, the first component $p_{int}[k]$ of the secondary reference pixel value and the second component $p_{grad}[k]$ of the secondary reference pixel value to generate the secondary reference pixel value $p_{rs}[k]$ based on the following equation:

$$p_{rs}[k] = w_{grad}[k] \cdot p_{grad}[k] + w_{int}[k] \cdot p_{int}[k]$$

wherein $w_{grad}[k] + w_{int}[k] = 1$ and $0 \le w_{grad}[k], w_{int}[k] \le 1$.

9. The apparatus of claim 8, wherein the processing circuitry is configured to adjust at least one of weights $w_{grad}[k]$ or $w_{int}[k]$ based on at least one of index k or a linear size of the current video coding block.

10. The apparatus of claim 1, wherein the processing circuitry is configured to intra predict the pixel values of the pixels of the current video coding block based on the plurality of primary reference pixel values and the plurality of secondary reference pixel values based on the following equation:

$$p[x,y] = w_0 \cdot p_{rs0} + w_1 \cdot p_{rs1},$$

wherein $p[x,y]$ denotes the pixel value of the pixel of the current video coding block having the coordinates x, y, $w_0$ denotes a first weight, $p_{rs0}$ denotes a primary reference pixel value, $w_1$ denotes a second weight, and $p_{rs1}$ denotes a secondary reference pixel value.

11. The apparatus of claim 10, wherein the processing circuitry is configured to intra predict the pixel values of the pixels of the current video coding block based on the plurality of primary reference pixel values and the plurality of secondary reference pixel values based on the following equation:

$$p[x, y] = \frac{d_{rs1}}{D} \cdot p_{rs0} + \frac{d_{rs0}}{D} \cdot p_{rs1},$$

wherein $d_{rs0}$ denotes the distance from the primary reference pixel associated with the primary reference pixel value $p_{rs0}$ to the pixel of the current video coding block having the coordinates x, y, $d_{rs1}$ denotes the distance from the secondary reference pixel associated with the secondary reference pixel value $p_{rs1}$ to the pixel of the current video coding block having the coordinates x, y, and D denotes the distance from the primary reference pixel associated with the primary reference pixel value $p_{rs0}$ to the secondary reference pixel associated with the secondary reference pixel value $p_{rs1}$, i.e. $D = d_{rs0} + d_{rs1}$.

12. The apparatus of claim 1, wherein the processing circuitry is further configured to encode the current video coding block based on the predicted video coding block.

13. The apparatus of claim 1, wherein the processing circuitry is further configured to restore the current video coding block based on intra predicting the pixel values of the pixels of the current video coding block.

14. The apparatus of claim 1, wherein the plurality of primary reference pixels are located in a row of pixels directly below the current video coding block and in a column of pixels to the left or to the right of the current video coding block.

15. A method for intra prediction of a current video coding block of a frame of a video signal, the current video coding block comprising a plurality of pixels, each pixel being associated with a pixel value, the method comprising:
generating, based on a plurality of primary reference pixel values, a plurality of secondary reference pixel values, wherein the plurality of primary reference pixel values are associated with a plurality of primary reference pixels located in neighboring video coding blocks of the current video coding block, and wherein each of the secondary reference pixel values is generated based on two or more of the primary reference pixel values;
intra predicting the pixel values of the pixels of the current video coding block based on the plurality of primary reference pixel values and the plurality of secondary reference pixel values;
determining, for each secondary reference pixel value of a subset of the plurality of secondary reference pixel values, a first component of the secondary reference pixel value based on directional intra prediction;
determining, for each secondary reference pixel value of the subset of the plurality of secondary reference pixel values, a second component of the secondary reference pixel value based on an interpolation prediction between a first secondary reference pixel value and a second secondary reference pixel value; and
for each secondary reference pixel value of the subset of the plurality of secondary reference pixel values, combining the first component of the secondary reference pixel value and the second component of the secondary reference pixel value to generate the secondary reference pixel value, wherein the first secondary reference pixel value and the second secondary reference pixel value are not part of the subset of the plurality of secondary reference pixel values.

16. The method of claim 15, further comprising:
encoding the current video coding block based on the predicted video coding block.

17. The method of claim 15, further comprising:
restoring the current video coding block based on intra predicting the pixel values of the pixels of the current video coding block.

18. A non-transitory computer readable medium comprising program code that, when executed on a computer, causes the computer to perform intra prediction of a current video coding block of a frame of a video signal, the current video coding block comprising a plurality of pixels, each pixel associated with a pixel value, by performing the steps of:
generating, based on a plurality of primary reference pixel values, a plurality of secondary reference pixel values, wherein the plurality of primary reference pixel values are associated with a plurality of primary reference pixels located in neighboring video coding blocks of the current video coding block, and wherein each of the secondary reference pixel values is generated based on two or more of the primary reference pixel values;
intra predicting the pixel values of the pixels of the current video coding block based on the plurality of primary reference pixel values and the plurality of secondary reference pixel values;
determining, for each secondary reference pixel value of a subset of the plurality of secondary reference pixel values, a first component of the secondary reference pixel value based on directional intra prediction;

determining, for each secondary reference pixel value of the subset of the plurality of secondary reference pixel values, a second component of the secondary reference pixel value based on an interpolation prediction between a first secondary reference pixel value and a second secondary reference pixel value; and for each secondary reference pixel value of the subset of the plurality of secondary reference pixel values, combining the first component of the secondary reference pixel value and the second component of the secondary reference pixel value to generate the secondary reference pixel value, wherein the first secondary reference pixel value and the second secondary reference pixel value are not part of the subset of the plurality of secondary reference pixel values.

* * * * *

UNITED STATES PATENT AND TRADEMARK OFFICE
CERTIFICATE OF CORRECTION

PATENT NO. : 10,887,587 B2
APPLICATION NO. : 16/383205
DATED : January 5, 2021
INVENTOR(S) : Filippov et al.

Page 1 of 1

It is certified that error appears in the above-identified patent and that said Letters Patent is hereby corrected as shown below:

On the Title Page

Page 2: item (56) Other Publications: Citation No. 14, "Shiodera et al., "Simplified Bidirectional intra prediction," JCTVCF253, Joint Collaborative Team on Video Coding (JCT-VC) of ITU-T SG16 WP3 and ISO/IEC JTC1/SC29/WG11, 6th Meeting: Torino, IT, pp. 1-8, XP030009276, International Union of Telecommunication----Geneva, Switzerland (Jul. 4-22, 2011)." should read -- Shiodera et al., "Simplified Bidirectional intra prediction," JCTVCF253, Joint Collaborative Team on Video Coding (JCT-VC) of ITU-T SG16 WP3 and ISO/IEC JTC1/SC29/WG11, 6th Meeting: Torino, IT, pp. 1-8, XP030009276, International Union of Telecommunication---- Geneva, Switzerland (Jul. 14-22, 2011) --

Page 2: item (56) Other Publications: Citation No. 15, "Shiodera et al., "Bidirectional infra prediction," VCEG-AE14, ITU-Telecommunications Standardization Sector, Study Group 16 Question 6, Video Coding Experts Group (VCEG), 31st Meeting: Marrakech, MA, pp. 1-6 XP030003517, International Union of Telecommunication----Geneva, Switzerland (Jan. 15-16, 2007)." should read -- Shiodera et al., "Bidirectional intra prediction," VCEG-AE14, ITU-Telecommunications Standardization Sector, Study Group 16 Question 6, Video Coding Experts Group (VCEG), 31st Meeting: Marrakech, MA, pp. 1-6 XP030003517, International Union of Telecommunication----Geneva, Switzerland (Jan. 15-16, 2007). --

Page 2: item (56) Other Publications: Citation No. 18, "Indian Patent Application No. 201817047254 filed on Dec. 13, 2018 and published on Feb. 22, 2019." should read -- Copy of Indian Patent Application No. 201817047254 filed on Dec. 13, 2018 and published on Feb. 22, 2019. --

Signed and Sealed this
Nineteenth Day of April, 2022

Katherine Kelly Vidal
*Director of the United States Patent and Trademark Office*